United States Patent [19]
Kurabayashi et al.

[11] Patent Number: 5,821,190
[45] Date of Patent: Oct. 13, 1998

[54] CATALYST COMPRISING IRIDIUM, ALKALINE METAL, ALKALINE EARTH OR RARE EARTH METAL, AND METAL CARBIDE OR METAL NITRIDE

[75] Inventors: Katsumi Kurabayashi; Yukio Kosaki, both of Numazu; Takashi Ito; Makoto Nagata, both of Ichikawa, all of Japan

[73] Assignee: N.E. Chemcat Corporation, Minato-ku, Japan

[21] Appl. No.: 651,158

[22] Filed: May 17, 1996

[30] Foreign Application Priority Data

May 18, 1995 [JP] Japan ................................. 7-153756

[51] Int. Cl.$^6$ ................ B01J 27/224; B01J 23/00; B01J 23/58; B01J 23/02
[52] U.S. Cl. .................. 502/178; 502/177; 502/200; 502/302; 502/303; 502/304; 502/325; 502/330; 502/328; 502/340; 502/344; 423/213.5; 423/239.1
[58] Field of Search ................... 502/326, 330, 502/177, 178, 200, 302, 303, 304, 328, 340, 344, 325; 423/213.5, 239.1

[56] References Cited

U.S. PATENT DOCUMENTS

| | | | |
|---|---|---|---|
| 4,221,768 | 9/1980 | Inoue et al. | 502/207 |
| 4,738,946 | 4/1988 | Yamashita et al. | 502/303 |
| 5,326,735 | 7/1994 | Itoh et al. | 502/177 |

FOREIGN PATENT DOCUMENTS

| | | |
|---|---|---|
| 57-13328 | 3/1982 | Japan. |
| 63-100919 | 5/1988 | Japan. |
| 1-135541 | 5/1989 | Japan. |
| 3-221144 | 9/1991 | Japan. |
| 3-293035 | 12/1991 | Japan. |
| 6-31173 | 2/1994 | Japan. |
| 7-31884 | 2/1995 | Japan. |

OTHER PUBLICATIONS

Greenwood et al. "Chemistry of the Elements" (No month, 1984) Pergamon Press Ltd., Oxford England, 1st ed., pp. 386 & 1292.

K. Taylor et al., *J. of Catalysis,* 63:53–71 (1980), "Selective Reduction of Nitric Oxide over Noble Metals".

*Primary Examiner*—Glenn Caldarola
*Assistant Examiner*—In Suk Bullock
*Attorney, Agent, or Firm*—David G. Conlin; Peter F. Corless; Dike, Bronstein, Roberts & Cushman LLP

[57] ABSTRACT

The present invention provides a catalyst and method for purifying exhaust gases, having superior performance of NOx purification to exhaust gases containing oxygen and nitrogen oxides, particularly superior performance of NOx elimination to exhaust gases from lean-bum engines with excess oxygen, and a wider effective temperature range of NOx elimination, and also superior heat resistance at high temperature, said catalyst for purifying exhaust gases comprises, as indispensable contents, iridium and alkaline metal loaded on a carrier which is at least one selected from metal carbide and metal nitride, or these and at least one element selected from the group consisting of alkaline earth metal elements and rare earth metal elements, and said method using these catalyst.

14 Claims, No Drawings

CATALYST COMPRISING IRIDIUM, ALKALINE METAL, ALKALINE EARTH OR RARE EARTH METAL, AND METAL CARBIDE OR METAL NITRIDE

FIELD OF INVENTION

The present invention relates to a catalyst and method for purifying exhaust gases exhausted from internal combustion engines, boilers, gas turbines and so on, particularly exhaust gases which contain nitrogen oxides with excess oxygen.

BACKGROUND OF THE INVENTION

Nitrogen oxides (NOx) exhausted from internal combustion engines, boilers and gas turbines can cause photochemical smog and acid rain; therefore elimination of nitrogen oxides (NOx) exhausted from these sources is an urgent task.

On the other hand, it has been demanded that exhausted carbon dioxide ($CO_2$) be controlled and that lean-burn engines that operate at a ratio of air to fuel higher than the chemical equivalent are developed practicably in order to prevent earth warming effects. Such lean-bum engines cannot utilize the three-way catalyst method (TWC) which has been used conventionally as the method for purifying exhaust gases of gasoline cars, that is to eliminate NOx, carbon monoxide (CO) and hydrocarbon (HC) simultaneously with a catalyst system of Pt-Rh/$Al_2O_3$ controlling the ratio of air (A) to fuel (F) at a near stoichiometric amount (A/F=14.6).

Further, it is an urgent task that suspended particulate matters and NOx in exhaust gases from diesel engines which are principally lean-bum type engines are eliminated.

In generally, such engines as lean-bum gasoline engines and diesel engines which are operated under lean-burn conditions are referred to as lean-burn engines.

With regards to the NOx elimination in exhaust gases of lean-bum engines, catalysts with various zeolites have been suggested. They are (1) Cu ion exchanged zeolite catalysts disclosed by, for example, Japanese Patent Application Laid-Open No. 63-100919/1988 and noble metals ion exchanged zeolite catalysts disclosed by, for example, Japanese Patent Application Laid-Open No. 1-135541/1989 and so on.

Also, (2) catalysts which contain noble metals, such as Pt, Pd, Rh, Ir, Ru and so on loaded on a porous metal oxides carrier, such as alumina, silica, titania, zirconia and so on (Japanese Patent Application Laid-Open No. 3-221144/1991 and Japanese Patent Laid-Open No. 3-293035/1991) have been reported.

Furthermore, recently the present inventors have disclosed that (3) catalysts which contain iridium loaded on at least one selected as a carrier from metal carbide and metal nitride (Japanese Patent Application Laid-Open No. 6-31173/1994) and catalysts which contain iridium and alkaline earth metals loaded on at least one selected as a carrier from metal carbide and metallic nitride (Japanese Patent Application Laid-Open No. 7-31884/1995) have the relatively high selective reduction ability of NOx in the presence of excess oxygen.

However, these catalysts can have drawbacks. For example, catalysts (1) are not practicable because an irreversible deactivation often occurs within a few hours by steam contained in exhaust gases at high temperature of 650°–700° C., and the problem of catalysts (2) containing noble metals loaded on a porous metallic oxide carrier is that hydrocarbon (HC) which is to be a reducing agent of NOx reacts preferentially with excess oxygen to NOx and the selectivity of NOx reduction reaction does not become higher because noble metals have strong oxidation catalyst activity. Also, although the SiC catalyst (3) carrying iridium or both of iridium and alkaline earth metal has high NO elimination selectivity and heat resistance as its merits, it can have a potential problem that its effective temperature range can be relatively narrow, and its NOx elimination ratio can deteriorate in the presence of high concentration of oxygen.

SUMMARY OF THE INVENTION

The present invention provides 1) a novel catalyst which has a broad NOx elimination effective temperature range and heat resistance against exhaust gases containing oxygen and nitrogen oxides, and 2) methods for purifying exhaust gases.

The present invention also provides a novel catalyst which has a sufficiently high efficiency of NOx elimination against lean-condition exhaust gases, such as exhaust gases having A/F=18 or more than 4% oxygen concentration, and heat resistance, and a novel methods for purifying exhaust gases.

DETAILED DESCRIPTION OF THE INVENTION

The present inventors have found that a catalyst comprising iridium and alkaline metal, or comprising these materials and at least one element selected from the group consisting of alkaline earth metal elements and rare earth metal elements, which are loaded on a carrier comprising at least one compound selected from the group consisting of metal carbides and metal nitrides can overcome the above-described problems.

The catalyst and method for purfying exhaust gases of the present invention is detailed as follows.

Carrier:

In the present invention, a carrier of the catalyst is used that contains at least one compound selected from the group of metal carbides and metal nitrides. The metal carbides and metal nitrides that may be used are not limited particularly. For example, suitable metal carbides include i.e. silicon carbide, titanium carbide, boron carbide, vanadium carbide, tantalum carbide, etc., and suitable metal nitrides include i.e. titanium nitride, zirconium nitride, etc. These materials can be used each solely as a carrier material, or a combination of two or more kinds of the materials may be used as a carrier material. It is preferable to use silicon carbide, titanium carbide, titanium nitride or combinations of two or more kinds of such materials as a carrier of the present invention. Forms of these metal carbides and metal nitrides are not limited particularly, and it is preferable that the form is stable at 800° C., more preferably more than 1000° C., in air with steam (moisture). It is preferable to use as carrier materials such as a powder which has a particle diameter of from about 0.1–100 μm, or whisker of the above-mentioned carrier materials.

Certain Ir catalyst for purifying exhaust gases loaded with high dispersion and minute particle diameter on porous metal oxides having high specific surface area has been used hitherto (disclosed in, for example, K. C. Tayler and J. C. Schlaher, *J. Catal.,* 63(1):53–71 (1980) and Japanese Patent Publication No. 57-13328/1982). In the present invention, a catalyst comprises a carrier which is not metal oxide, but is a metal carbide or metal nitride. Also, a catalyst carrier of the invention preferably is not porous and does not have high specific surface area, but rather is substantially non-porous and has low specific surface area. Therefore, the catalyst of the present invention has very superior characteristics such as high selectivity and durability against purification of NOx in exhaust gases with excess oxygen at high temperature in the presence of steam.

It is preferable that metal carbides and metal nitride used as a carrier in the present invention has from about 3 to 35 $m^2/g$ of BET specific surface area and less than about 0.55 $m^3/g$ of pore volume.

Active Component:

The catalyst of the present invention comprises Ir and alkaline metal elements loaded on the above-described carrier as active components. The state of loaded Ir can suitably vary. Preferably the loaded Ir is in a metallic state, oxide state such as IrO, $Ir_2O_3$ and $IrO_2$, the state of oxidate salt of Ir with alkaline metal such as $Na_2IrO_3$, $K_2IrO_3$ and so on, alloy state consisting of Ir and alkaline metal such as $Na_2Ir$, $K_2Ir$ and so on, or the mixture state of these materials.

These Ir, Ir alloy and Ir oxide materials are loaded on a carrier with alkaline metals and their particle diameter are preferably from about 2 to 100 nm, more preferably from about 5 to 30 nm.

The loaded amount of Ir to the carrier, on the basis of metallic iridium, is preferably 0.1–10.0% by weight based on gross (total) weight of the catalyst, more preferably 0.5–5.0 weight %.

In the present invention, the catalyst can comprise of alkaline metal such as Li, Na, K, Rb and Cs, preferably Li, Na and K. In the case of using these materials, only one kind of them may be loaded on a carrier and used, or two or more kinds of them may be loaded on a carrier and used. A state of alkaline metal loaded on a carrier in catalyst is not limited particularly. For example, states of metal, oxides, oxidate salts of Ir etc., alloy with Ir, and mixtures consisting of these materials may be used. The amount of alkaline metal loaded on a carrier can vary suitably, and preferably the atomic ratio of alkaline metal to Ir is 1:1 to 20:1, more preferably 3:1 to 11:1.

The present invention also provides a catalyst comprising Ir, alkaline metal element and at least one element selected from the group consisting of alkaline earth metal elements and rare earth metal elements loaded on the above-described carrier. Alkaline earth metal elements such as Be, Mg, Ca, Sr and Ba can be used, and preferably Mg, Ca, Sr and Ba may be used. Rare earth metal elements such as Y, La, Ce, Pr, Nd, Sm, Gd, Tb, Dy, Ho, Er, Tm and Yb can be used, and preferably Y, La, Ce, Nd and Yb may be used.

The state of alkaline earth metal element and rare earth metal element loaded on a carrier in the catalyst is not limited particularly. Preferably, states of metal, metal oxide, complex oxide with Ir and so on, alloy with Ir, alloy containing alkaline metal etc. and Ir etc., and mixtures consisting of these materials may be used. The amount of alkaline earth metal and rare earth metal loaded on a carrier can vary suitably, and preferably the atomic ratio of alkaline metal to Ir is 0.5:1 to 20:1, more preferably about 1:1 to 10:1.

Preparation Method:

Methods for preparation of catalyst of the present invention are not limited particularly, and methods such as impregnation, absorption, precipitation and sticking, evaporation to dryness, spray to dryness and other known methods may be employed.

The catalyst loading Ir and alkaline metal may be prepared by the simultaneous loading method of Ir and alkaline metal, that is, a carrier such as metal carbide or metal nitride is impregnated with the homogeneously mixed solution of raw compounds of Ir and alkaline metal, and then calcined. Alternatively, the stepwise loading method may be applied in the present invention. By this method, the above-described carrier is impregnated with a solution of raw material of iridium, dried and then calcined to fix Ir on the carrier as an insoluble compound of Ir or Ir metal, and thereafter the carrier is impregnated with a solution of raw material of alkaline metal, dried again, and calcined. Consequently Ir and alkaline metal are loaded on the carrier. Another variation of the stepwise loading method that may be employed is that alkaline metal is loaded and fixed (calcined) on the carrier firstly and then Ir is loaded and fixed (calcined) on the carrier.

Further, the preparation for the catalyst comprising Ir, alkaline metal and at least one element selected from the group consisting of alkaline earth metal elements and rare earth metal elements loaded on the carrier may be applied either by the above-described simultaneous loading method or the multistage stepwise loading method.

In the preparation for catalyst of the present invention, raw materials of Ir and alkaline metal are not limited particularly. For example, water-soluble salts such as iridium trichloride ($IrCl_3$), hexachloroiridic acid ($H_2IrCl_6$), hexachloroiridate(III) sodium ($Na_3IrCl_6$), hexachloroiridate (IV) sodium ($Na_2IrCl_6$), iridium(IV) nitrate ($Ir(NO_3)_4$), and iridium(IV) sulfate ($Ir(SO_4)_2$) etc. can be used. Also, an organic metal complex of Ir such as $Ir_4(CO)_{12}$ and so on dissolved in an organic solvent such as hexane, ethanol and so on, may be used.

Raw materials of alkaline metal elements that can be used to prepare catalysts of the present invention include oxides, hydroxides, chlorides, nitrates and acetates of alkaline metal elements.

Raw materials of alkaline earth metal elements and rare earth metal elements that can be used to prepare catalysts of the present invention include hydrochlorides, nitrates, nitrites, acetates and so on of alkaline earth metal elements and rare earth metal elements. Particularly preferred are hydrochlorides and nitrates of alkaline earth metal elements and rare earth metal elements because of the high water solubility of those materials.

Further, in addition to the above-described materials of catalysts of the invention, other metals and/or non-metal materials may be suitably used to the extent that the catalyst activity of the present invention is not significantly inhibited.

In the above-described simultaneous loading method or the multistage stepwise loading method, the atmosphere in which calcinating decomposition is conducted of compound containing Ir, alkaline metal and/or at least one element selected from the group consisting of alkaline earth metals and rare earth metals loaded on the carrier as catalyst precursor, may be suitably selected from any of air, vacuum, inert gas stream such as nitrogen and so on, or hydrogen stream according to the kind of precursor.

In these methods, preferred calcination temperatures are from 300° to 900° C., and more preferably the calcination temperature is from 600° to 800° C. The duration of the calcination process is typically from 10 minutes to 20 hours, and preferably the calcination time is from 30 minutes to 5 hours. Calcination may be conducted by more than one treatment wherein multiple treatments are combined in step-by-step fashion. For example, the treatment may be the calcination at 600°–800° C. in air and then the reduction at 600°–900° C. in hydrogen gas stream.

After preparation of powder state, the catalysts may be shaped as desired to a certain stable form, for example, pellets, beads, rings, honeycomb, by mixing with a suitable binder or without any binder. The catalyst also may be prepared by impregnating a suitably pre-shaped carrier with catalytic active components of the present invention. The catalysts of the invention also may be coated and used on a pre-shaped refractory support substrate which is formed into a monolyth as a honeycomb structure, or a foam state by ceramics such as cordierite and mullite and metal such as stainless steel, with suitable binder or without any binder.

Suitable binders that can be used include known inorganic binders such as silica sol, alumina sol, titania sol and so on. Methods for coating refractory support substrates with catalyst powder of the invention are not limited, and known methods such as wash coating method, sol-gel method and so on can be used.

The amount of coating of the catalyst on the support substrate is not limited particularly, and the coating amount is preferably 50–200 g/l per unit volume of substrate, and it is more preferably 80–160 g/l per unit volume of substrate.

The amount of loaded Ir is preferably 0.05–20.0 g/l per unit volume of substrate, and more preferably 0.3–5.0 g/l per unit volume of substrate.

Usage:

The catalyst of the present invention selectively reduces and purifies nitrogen oxides in exhaust gases containing oxygen and nitrogen oxides to nitrogen ($N_2$) and water ($H_2O$) by contacting of the catalyst and exhaust gases. The exhaust gases to be purified may be unlimited, and preferably exhaust gases to be purified are exhausted from internal combustion engines and so on such as automobiles etc. In the case that exhaust gases to be purified contain reducing component for nitrogen oxides, the other reducing agent such as hydrocarbon etc. is not particularly needed to be added into the exhaust gases. However, before contacting the catalyst with the exhaust gases, hydrocarbon such as propane gas and gas oil can be added into the exhaust gases according to necessity. In such addition, reducing components such as hydrocarbon and carbon monoxide (CO) already contained in or added into exhaust gases are oxidized to carbon dioxide ($CO_2$) and $H_2O$ and the exhaust gases are purified.

Gas space velocity of exhaust gases with respect to the catalyst of the invention is not limited particularly, and it is preferably 5,000–400,000 L/hr, more preferably 10,000–200,000 L/hr.

The inlet gas temperature of the present catalyst (i.e. the temperature of the exhaust gas as it contacts the catalyst) to reduce and eliminate NOx selectively and efficiently can be selected from various ranges according to the exhaust gases being purified, and it is preferably the range of 200° C. to 700° C., more preferably the range of 300° C. to 600° C.

In the method for purifying exhaust gases of the present invention, a weight ratio of oxidizing components to reducing components (A/F) of the exhaust gas is not limited particularly. The ratio may be either smaller or larger ratio than stoichiometric ratio (A/F=14.7).

Recently internal combustion engines which have A/F>14.7 of the above-described ratio in exhaust gases have been developed, and that ratio value means that A/F ratio is in a lean side of reducing components. Catalysts of the present invention have sufficient purification activity even with respect to such exhaust gases having high A/F ratios on the lean side of reducing components. Conventional noble metal catalysts have shown very insufficient NOx reduction selectivity to such exhaust gases in a lean state with excess oxygen. However, catalysts of the present invention have shown sufficiently high ratios of NOx purification at a wide temperature range such as 300°–500° C., in the cases of exhaust gases where A/F is even more than 18 or $O_2$ concentration is more than 4%. Further, catalysts of the present invention have shown sufficient NOx reduction activity without an addition of hydrocarbon (HC) as reducing agent even with exhaust gases that have A/F ratio of more than 22 or $O_2$ concentration more than 7.5%, which are very high $O_2$ concentration, because the catalysts of the invention have very sufficient selectivity to NOx reduction. Hydrocarbon (HC) can be added if desired into exhaust gases containing excess oxygen preferably to the extent that the A/F ratio is not lower than 14.7.

Activity:

NOx in exhaust gases is reduced and decomposed to $N_2$ and $H_2O$ with reducing agents such as HC and CO which may be co-existing in the exhaust gas, and/or the HC which may be added into the exhaust gases prior to contact with a catalyst of the invention, by contacting the exhaust gases with the catalyst of the present invention. Because active metal Ir with alkaline metal is loaded and stabilized on metal carbide or metal nitride, catalysts of the invention exhibit reduction selectivity of NOx in the presence of reducing agent such as HC, CO, etc. in exhaust gases is improved. As the result, NOx in exhaust gases is eliminated in sufficiently high amounts over a wide range of gas temperatures. For example, the NOx elimination ratio (that ratio defined below) provided by catalysts of the invention is suitable about 50% or greater, and preferably about 60% or greater at any of temperatures of 350° C., 400° C. or 450° C.

Moreover, catalysts of the invention containing Ir, alkaline metal and also at least one element selected from the group consisting of alkaline earth metal elements and rare earth metal elements has a stable ratio of NOx elimination in the wider range of gas temperature and the lower dependence of NOx elimination ratio on gas temperature of NOx elimination ratio compared with the catalyst containing only Ir and alkaline metal.

The present invention will be described with reference to several examples and comparative examples thereof. These examples do not limit the scope of the present invention.

Preparation for Catalyst:

EXAMPLE 1

Honeycomb Coated with Ir—K/SiC Catalyst (A-1)

Deionized water 1400 ml was poured into a 3 L beaker, and powder of silicon carbide (SiC) 70 g, which had BET 15 $m^2$/g of BET specific surface area, was added into the water. That mixture was then stirred for 20 minutes and an SiC slurry was obtained. 100 ml of a mixture in aqueous solution consisting of hexachloroiridic acid ($H_2IrCl_6$) containing 0.84 g of iridium and potassium chloride (KCl) containing 0.84 g of potassium was added in the slurry, and the water content was evaporated from the solution by stirring on a hot plate. The thus obtained residual solid was dried with an electric-drying oven at 105° C. for 16 hours, milled with a mortar, and the obtained powder was calcined in an electric furnace at 750° C. for 30 minutes in air. After that, the calcinated powder was reduced at 700° C. for 2 hours in hydrogen stream, and the catalyst powder of 1.2% Ir-1.2% K/SiC (the loading amount is indicated by weight % to the catalyst in the present examples and comparative examples) was obtained.

70 g of deionized water and alumina sol containing 10 wt % of $Al_2O_3$ solid were added to 30 g of the catalyst powder. The mixture was milled with wet process by ball mill for 5 hours, and catalyst slurry was obtained. A corepiece with 1.5 inches of diameter and 5 inches of length scooped out from the commercially available cordierite honeycomb (400 cells/inch$^2$). The corepiece was dipped into and covered with the catalyst slurry and removed. Excess slurry was removed from the core by air knife. The corepiece was then dried at 300° C. for 20 minutes, and also calcined at 500° C. for 30 minutes in air. And honeycomb (A-1) was provided, which was coated with the catalyst powder 130 g solid per honeycomb 1 L (liter) by dry basis.

EXAMPLE 2

Honeycomb Coated with Ir—Na/SiC Catalyst (A-2)

Deionized water 60 g and alumina sol containing 10 wt % of $Al_2O_3$ solid were added to powder of silicon carbide (SiC) 30 g, which had 15 m$^2$/g of BET specific surface area. That mixture was milled with wet process by ball mill for 5 hours, and SiC slurry was obtained. By the same procedures disclosed above in Example 1, the slurry was washcoated onto a cordierite honeycomb, and the honeycomb was provided which was coated with the SiC powder 130 g solid per honeycomb 1 L (liter) by dry basis. The honeycomb coated with SiC was dipped into a mixture in aqueous solution consisting of hexachloroiridic acid ($H_2IrCl_6$) containing 0.42 g of iridium and sodium chloride (NaCl) containing 0.42 g of sodium at room temperature for 3 minutes, and removed. Excess solution was then removed from the honeycomb by air-blowing, and the honeycomb was dried at 300° C. for 20 minutes, and then calcined at 750° C. for 1 hour. After reducing at 700° C. for 2 hours in hydrogen stream, honeycomb (A-2) coated with 0.6% Ir-0.6% Na/SiC catalyst was obtained.

EXAMPLE 3

Honeycomb Coated with Ir—K—Mg/SiC Catalyst (A-3)

By the same procedures disclosed above in Example 1, a mixture in aqueous solution consisting of hexachloroiridic acid ($H_2IrCl_6$) containing 0.84 g of iridium and magnesium chloride ($MgCl_2.6H_2O$) containing 0.84 g of magnesium and potassium chloride (KCl) containing 0.56 g of potassium was used instead of the aqueous solution of hexachloroiridic acid and potassium chloride, and the other procedures were done similarly. Honeycomb (A-3) coated with 1.2% Ir-0.8% K-1.2% Mg/SiC catalyst was thus obtained.

EXAMPLE 4

Honeycomb Coated with Ir—K—Ca/SiC Catalyst (A-4)

By the same procedures disclosed above in Example 3, a mixture in aqueous solution consisting of hexachloroiridic acid ($H_2IrCl_6$) containing 0.84 g of iridium and calcium chloride hydrate ($CaCl_3.4H_2O$) containing 0.84 g of calcium and potassium chloride (KCl) containing 0.569 of potassium was used instead of the aqueous solution of hexachloroiridic acid, magnesium chloride and potassium chloride, and the other procedures were done similarly. Honeycomb (A-4) coated with 1.2% Ir-0.8% K-1.2% Ca/SiC catalyst was thus obtained.

EXAMPLE 5

Honeycomb Coated with Ir—K—Ba/SiC Catalyst (A-5)

By the same procedures disclosed above in Example 3, a mixture in aqueous solution consisting of hexachloroiridic acid ($H_2IrCl_6$) containing to 0.84 g of iridium and barium chloride ($BaCl_3.2H_2O$) containing 1.26 g of barium and potassium chloride (KCl) containing 0.56 g of potassium was used instead of the aqueous solution of hexachloroiridic acid and magnesium chloride and potassium chloride, and the other procedures were done similarly. Honeycomb (A-5) coated with 1.2% Ir-0.8% K-1.7% Ba/SiC catalyst was thus obtained.

EXAMPLE 6

Honeycomb Coated with Ir—K—Sr/SIC Catalyst (A-6)

By the same procedures disclosed above in Example 3, a mixture in aqueous solution consisting of hexachloroiridic acid ($H_2IrCl_6$) containing 0.84 g of iridium and strontium chloride ($SrCl_2.6H_2O$) containing 0.84 g of strontium and potassium chloride (KCl) containing 0.56 g of potassium was used instead of the aqueous solution of hexachloroiridic and magnesium chloride and potassium chloride, and the other procedures were done similarly. Honeycomb (A-6) coated with 1.2% Ir-0.8% K-1.2% Sr/SiC catalyst was obtained.

EXAMPLE 7

Honeycomb Coated with Ir—K—Y/SiC Catalyst (A-7)

By the same procedures disclosed above in Example 2, a mixture in aqueous solution consisting of hexachloroiridic acid ($H_2IrCl_6$) containing 0.42 g of iridium and yttrium chloride ($YCl_6.6H_2O$) containing 0.28 g of yttrium and potassium chloride (KCl) containing 0.28 g of potassium was used instead of the aqueous solution of hexachloroiridic acid and sodium chloride, and the other procedures were done similarly. Honeycomb (A-7) coated with 0.6% Ir-0.4% K-0.4% Y/SiC catalyst was thus obtained.

EXAMPLE 8

Honeycomb Coated with Ir—K—La/SiC Catalyst (A-8)

By the same procedures disclosed above in Example 3, a mixture in aqueous solution consisting of hexachloroiridic acid ($H_2IrCl_6$) containing 0.84 g of iridium and lanthanum chloride hydrate ($LaCl_3.6H_2O$) containing 0.84 g of lanthanum and potassium chloride (KCl) containing 0.56 g of potassium was used instead of the aqueous solution of hexachloroiridic acid and magnesium chloride and potassium chloride, and the other procedures were done similarly. Honeycomb (A-8) coated with 1.2% Ir-0.8% K-1.2% La/SiC catalyst was thus obtained.

EXAMPLE 9

Honeycomb Coated with Ir—K—Ce/SiC Catalyst (A-9)

70 g of powder of silicon carbide (SiC), which had BET 31 m$^2$/g of BET specific surface area, was added into deionized water 1400 ml, and that mixture was stirred, to provide an SiC slurry. Added to this SiC slurry were 1) 100 ml of an aqueous solution of hexachloroiridic acid ($H_2IrCl_6$) containing 0.84 g of iridium, and then 2) 100 ml of aqueous solution of cerium acetate hydrate ($Ce(CH_3CO_2)_3.1H_2O$) containing 1.6 g of cerium, and lastly 3) 100 ml of aqueous solution of potassium hydroxide (K(OH)) containing to 1.0 g of potassium. The water content was then evaporated from the mixture solution. The resultant dried powder was calcined with an electric furnace at 800° C. for 2 hours in air, and thereafter, the obtained powder was treated by the same procedures as Example 1. Honeycomb (A-9) coated with 1.1% Ir-1.4% K-2.2% Ce/SiC catalyst was thus obtained.

EXAMPLE 10

Honeycomb Coated with Ir—K—Nd/SiC Catalyst (A-10)

By the same procedures disclosed above in Example 9, an aqueous solution of neodymium nitrate hydrate [$Nd(NO_3)_3 \cdot 6H_2O$] containing 1.7 g of neodymium was used instead of the aqueous solution of cerium acetate hydrate, and the other procedures were done similarly. Honeycomb (A-10) coated with 1.1% Ir-1.4% K-2.3% Nd/SiC catalyst was thus obtained.

EXAMPLE 11

Honeycomb Coated with Ir—K—Nd/SiC Catalyst (A-11)

By the same procedures disclosed above in Example 10, an aqueous solution of potassium hydroxide containing 1.9 g of K was added instead of the aqueous solution of potassium hydroxide containing 1.0 g of K, and the other procedures were done similarly. Honeycomb (A-11) coated with 1.1% Ir-2.4% K-2.3% Nd/SiC catalyst was thus obtained.

EXAMPLE 12

Honeycomb Coated with Ir—Li—Nd/SiC Catalyst (A-12)

By the same procedures disclosed above in Example 10, an aqueous solution of lithium hydroxide (LiOH) containing 0.18 g of Li was added instead of the aqueous solution of potassium hydroxide, and the other procedures were done similarly. Honeycomb (A-12) coated with 1.1% Ir-0.2 % Li-2.3 % Nd/SiC catalyst was thus obtained.

EXAMPLE 13

Honeycomb Coated with Ir—Na—Nd/SiC Catalyst (A-13)

By the same procedures disclosed above in Example 10, an aqueous solution of sodium hydroxide (NaOH) containing 0.59 g of Na was added instead of the aqueous solution of potassium hydroxide, and other procedures were done similarly. Honeycomb (A- 13) coated with 1.1% Ir-0.8% Na-2.3% Nd/SiC catalyst was thus obtained.

EXAMPLE 14

Honeycomb Coated with Ir—K—Yb/SiC Catalyst (A-14)

By the same procedures disclosed above in Example 10, an aqueous solution of ytterbium nitrate hydrate [$Yb(NO_3)_3 \cdot 6H_2O$] containing 2.3 g of Yb was added instead of the aqueous solution of neodymium nitrate, and the other procedures were done similarly. Honeycomb (A-14) coated with 1.1% Ir-1.3% K-3.1% Yb/SiC catalyst was thus obtained.

EXAMPLE 15

Honeycomb Coated with Ir—K—Nd/SiC Catalyst (A-15)

By the same procedures as Example 10, powder of SiC with 15 $m^2/g$ of BET specific surface area, which was used in Example 1, was used instead of powder of SiC with 31 $m^2/g$ of BET specific surface area, and the other procedures were done similarly. Honeycomb (A-15) coated with 1.1% Ir-1.4% K-2.3% Nd/SiC catalyst was thus obtained.

EXAMPLE 16

Honeycomb coated with Ir—K—Nd/TiN catalyst (A-16)

In the same procedures as Example 10, powder of titanium nitride (TiN) with 3 $m^2/g$ of BET specific surface area was used instead of powder of SiC, and other procedures were done similarly. Honeycomb (A-16) coated with 1.1 % Ir-1. 4% K-2.3% Nd/TiN catalyst was thus obtained.

Comparative Example 1

Honeycomb Coated with Ir/SiC Catalyst (B-1)

In the same procedures as Example 1 above, only an aqueous solution of hexachloroiridic acid containing 0.84 g of iridium was added into SiC slurry instead of mixture aqueous solution of hexachloroiridic acid and potassium chloride, and the other procedures were done similarly. Honeycomb (B-1) coated with 1.2% Ir/SiC catalyst was thus obtained.

Comparative Example 2

Honeycomb Coated with K/SiC Catalyst (B-2)

In the same procedures as Example 1 above, only an aqueous solution of potassium hydroxide containing 0.84g of potassium was added into SiC slurry instead of the aqueous solution of hexachloroiridic acid and potassium chloride, and the other procedures were done similarly. Honeycomb (B-2) coated with 1.2% K/SiC catalyst was thus obtained.

Comparative Example 3

Honeycomb Coated with Nd/SiC Catalyst (B-3)

In the same procedures as Example 10 above, only an aqueous solution of neodymium nitrate hydrate containing 1.7 g of neodymium was added into SiC slurry instead of aqueous solution of hexachloroiridic acid, neodymium nitrate hydrate and potassium chloride, and the other procedures were done similarly. Honeycomb (A-11) coated with 2.3% Nd/SiC catalyst was thus obtained.

Comparative Example 4

Honeycomb Coated with Ir—Ca/SiC Catalyst (B-4)

In the same procedures as Example 2 above, a honeycomb coated with SiC was dipped into a mixture in an aqueous solution consisting of hexachloroiridic acid containing 0.42 g of Ir and calcium chloride containing 0.49 g of Ca instead of the aqueous solution of hexachloroiridic acid and sodium chloride, and the other procedures were done similarly. Honeycomb (B-4) coated with 0.6% Ir-0.7% Ca/SiC catalyst was thus obtained.

Comparative Example 5

Honeycomb Coated with Ir—K/$Al_2O_3$ Catalyst (B-5)

In the same procedures as Example 1, powder of activated alumina with 160 $m^2/g$ of BET specific surface area was used instead of the powder of SiC, and the other procedures were done similarly. Honeycomb (B-5) coated with 1.2% Ir-1.2% K/Al$_2$O$_3$ catalyst was thus obtained.

EXAMPLE OF PERFORMANCE ASSESSMENT 1

Performance assessment of NOx elimination to exhaust gases of gasoline lean-burn engines Corepieces of honeycombs A-1 to A-16 of Examples of the present invention and honeycombs B-1 to B-5 of Comparative Examples above were treated beforehand by aging at 800° C. for 2 hours under stream of a gas mixture consisting of 10% water-90% nitrogen. The corepieces were then charged into respective multi-chamber converters. A gasoline lean-burn engine with 1500 cc of engine displacement was driven at 2500 rpm and A/F=23 (ratio of air to fuel), and the multi-chamber convertor was connected to the exhaust gas system of the engine. NOx concentrations in exhaust gases at an inlet port and an outlet port of each of the above catalysts were measured with NOx meter at 350° C., 400° C. and 450° C. of inlet gas temperature, and NOx conversion activity of each catalyst was assessed. NOx elimination ratio (%) at each inlet gas temperature was calculated according to Formula (I) described below. In the catalysts of Examples of the present invention (i.e. Examples 1–16), any by-product harmful gas such as N$_2$O, NH$_3$, and HCN was not detected in the outlet port of the catalyst by N$_2$O meter and NH$_3$-gas and HCN-gas detectors. Formula (I):

The results set forth in Table 1 below show that the catalysts of the invention have exceedingly high NOx elimination ratio to exhaust gases from lean-burn engines compared with prior catalysts carrying Ir such as Ir/SiC catalyst (B-1) of Comparative Example 1 (see Japanese Patent Application Laid-Open No. 6-31173/1994), Ir-alkaline metal/SiC catalyst (B-4) of Comparative Example 4 (see Japanese Patent Application Laid-Open No. 7-31884/1995) and Ir-alkyl/γ-alumina catalyst (B-5) of Comparative Example 5 (see Japanese Patent Publication No. 57-13328/1982).

Effect of the Present Invention

As described above, catalysts for purifying exhaust gases of the present invention have superior performance of NOx purification to exhaust gases containing oxygen and nitrogen oxides. In particular, catalysts of the invention have superior performance of NOx elimination to exhaust gases from lean-burn engines with excess oxygen compared with prior catalysts and also have a wider effective temperature range of NOx elimination. Furthermore, catalysts of the present invention exhibit superior heat resistance upon exposure to high temperatures.

The catalyst for purifying exhaust gases is effective to eliminate nitrogen oxides contained in exhaust gases with oxygen and steam from automobiles, boilers and so on.

TABLE 1

| | Honeycomb coated with Catalyst | Exhaust Gas Temperature at Inlet of Catalyst (°C.) | | |
|---|---|---|---|---|
| | | NOx elimination ratio (%) at 350° C. | NOx elimination ratio (%) at 400° C. | NOx elimination ratio (%) at 450° C. |
| Ex. 1 | Ir—K/SiC (A-1) | 82 | 71 | 58 |
| Ex. 2 | Ir—Na/SiC (A-2) | 70 | 67 | 57 |
| Ex. 3 | Ir—K—Mg/SiC (A-3) | 80 | 78 | 68 |
| Ex. 4 | Ir—K—Ca/SiC (A-4) | 79 | 77 | 67 |
| Ex. 5 | Ir—K—Ba/SiC (A-5) | 66 | 64 | 55 |
| Ex. 6 | Ir—K—Sr/SiC (A-6) | 78 | 68 | 53 |
| Ex. 7 | Ir—K—Y/SiC (A-7) | 77 | 71 | 54 |
| Ex. 8 | Ir—K—La/SiC (A-8) | 78 | 73 | 59 |
| Ex. 9 | Ir—K—Ce/SiC (A-9) | 68 | 65 | 56 |
| Ex. 10 | Ir—K—Nd/SiC (A-10) | 78 | 76 | 65 |
| Ex. 11 | Ir—K—Nd/SiC (A-11) | 68 | 76 | 67 |
| Ex. 12 | Ir—Li—Nd/SiC (A-12) | 73 | 71 | 61 |
| Ex. 13 | Ir—Na—Nd/SiC (A-13) | 69 | 67 | 58 |
| Ex. 14 | Ir—K—Yb/SiC (A-14) | 67 | 65 | 55 |
| Ex. 15 | Ir—K—Nd/SiC (A-15) | 76 | 70 | 59 |
| Ex. 16 | Ir—K—Nd/TiN (A-16) | 68 | 66 | 67 |
| C. Ex. 1 | Ir/SiC (B-1) | 37 | 21 | 9 |
| C. Ex. 2 | K/SiC (B-2) | 0 | 0 | 2 |
| C. Ex. 3 | Nd/SiC (B-3) | 0 | 1 | 3 |
| C. Ex. 4 | Ir—Ca/SiC (B-4) | 43 | 25 | 11 |
| C. Ex. 5 | Ir—K/Al$_2$O$_3$ (B-5) | 5 | 13 | 9 |

"Ex." means Example.
"C. Ex." means Comparative Example.

NOx elimination ratio (%) =

$$\frac{\text{NOx concentration }(A) - \text{NOx concentration }(B)}{\text{NOx concentration }(A)}$$

(in the above Formula (I), NOx concentration (A) means NOx concentration at an inlet of catalyst, and NOx concentration (B) means NOx concentration at an outlet of catalyst).

NOx elimination ratio of each catalyst at the various inlet gas temperatures is set forth Table 1 below.

What is claimed is:

1. A catalyst for purifying exhaust gases consisting of iridium, an alkaline metal and a carrier which is at least one selected from a metal carbide or a metal nitride.

2. A catalyst according to claim 1 wherein the alkaline metal is selected from the group consisting of lithium, sodium and potassium.

3. A catalyst according to claim 1 wherein the carrier is a metal carbide carrier.

4. A catalyst according to claim 1 wherein the carrier is silicon carbide.

5. A catalyst for purifying exhaust gases comprising 1) iridium, 2) an alkaline metal, 3) an alkaline earth metal element or a rare earth element and a 4) a carrier which comprises a metal carbide or metal nitride.

6. The catalyst of claim 5 wherein the catalyst comprises an alkaline earth metal element.

7. The catalyst of claim 6 wherein the alkaline metal is selected from the group consisting of lithium, sodium and potassium.

8. The catalyst of claim 6 wherein the alkaline earth metal is selected from the group consisting of magnesium, calcium, strontium and barium.

9. The catalyst of claim 5 wherein the catalyst comprises a rare earth element.

10. The catalyst of claim 9 wherein the rare earth metal is selected from the group consisting yttrium, lanthanum, cerium, neodymium and ytterbium.

11. The catalyst of claim 9 wherein the alkaline metal is selected from the group consisting of lithium, sodium and potassium.

12. The catalyst of claim 5 wherein the carrier is a metal carbide carrier.

13. The catalyst of claim 5 wherein the carrier is silicon carbide.

14. The catalyst of claim 5 wherein the catalyst is coated on a refractory support substrate.

* * * * *